US009695942B2

(12) United States Patent
Takahashi et al.

(10) Patent No.: US 9,695,942 B2
(45) Date of Patent: Jul. 4, 2017

(54) ROTARY JOINT

(75) Inventors: Hidekazu Takahashi, Tokyo (JP);
Mami Uchiyama, Toyko (JP)

(73) Assignee: EAGLE INDUSTRY CO., LTD,
Tokyo (JP)

(*) Notice: Subject to any disclaimer, the term of this patent is extended or adjusted under 35 U.S.C. 154(b) by 1113 days.

(21) Appl. No.: 12/934,663

(22) PCT Filed: Feb. 13, 2009

(86) PCT No.: PCT/JP2009/052392
§ 371 (c)(1),
(2), (4) Date: Sep. 27, 2010

(87) PCT Pub. No.: WO2009/119176
PCT Pub. Date: Oct. 1, 2009

(65) Prior Publication Data
US 2011/0018255 A1    Jan. 27, 2011

(30) Foreign Application Priority Data

Mar. 28, 2008  (JP) .................... 2008-087509

(51) Int. Cl.
*F16J 15/34* (2006.01)
*F16L 27/087* (2006.01)
*H02K 5/124* (2006.01)
*H02K 55/04* (2006.01)
*F16L 59/18* (2006.01)
*F16L 39/04* (2006.01)
*F16J 15/43* (2006.01)
*H02K 55/00* (2006.01)

(52) U.S. Cl.
CPC .......... *F16J 15/3484* (2013.01); *F16J 15/43* (2013.01); *F16L 27/087* (2013.01); *F16L 39/04* (2013.01); *F16L 59/185* (2013.01); *H02K 5/124* (2013.01); *H02K 55/04* (2013.01); *H02K 55/00* (2013.01); *Y02E 40/62* (2013.01); *Y02E 40/625* (2013.01)

(58) Field of Classification Search
USPC ................ 285/9.1, 127.1, 153.1, 272.1, 273
See application file for complete search history.

(56) References Cited

U.S. PATENT DOCUMENTS 3,991,588 A * 11/1976 Laskaris ................... 62/50.7
5,288,253 A *  2/1994 Urdshals et al. .............. 441/5

FOREIGN PATENT DOCUMENTS

| JP | 9322523 A | 12/1997 |
| JP | 1194095 A | 4/1999 |
| WO | 2006080280 A1 | 1/2006 |

* cited by examiner

*Primary Examiner* — James M Hewitt
(74) *Attorney, Agent, or Firm* — Harness, Dickey & Pierce, P.L.C.

(57) ABSTRACT

A rotary joint for maintaining a cryogenic supplying refrigerant comprises a vacuum use cylindrical shaft supported in rotatable condition, a rotary seal ring fitted to an outer circumferential face with a space, a stationary seal ring provided at both sides of the respective rotary seal rings, a resilient bellows to press the stationary ring resiliently to the rotary seal ring side, a spaced fluid passage formed between the respective resilient bellows, a second fluid passage communicating with the spaced fluid passage, a connecting fluid passage communicating with the second fluid passage, a first pipe communicating through the spaced fluid passage, a connecting cover having a suction bore for vacuumizing and a magnetic fluid seal device having a projection constituted as multiple gaps corresponding to a pressure of the vacuumizing.

6 Claims, 9 Drawing Sheets

ROTARY JOINT

TECHNICAL FIELD

The present invention relates to a rotary joint with a mechanical seal device provided at an intermediate of a flow passage for a refrigerant to cool a cooling portion as a superconductive magnetic field coil of a superconducting motor and so on by the refrigerant. For more detail, the present invention relates to a rotary joint with a mechanical seal device so as to make available to introduce a supplying refrigerant from a stationary refrigerating machine to a rotary side cooling portion through a relative rotary portion in cryogenic condition.

BACKGROUND ART

In a superconducting apparatus such as a superconducting motor and the like, a cryogenic refrigerant such as liquid nitrogen and liquid helium and the like must be supplied to a cooling portion such as a superconducting field coil for maintaining a superconducting status of the super conducting field coil. Also, the refrigerant after use at the cooling portion (referred as "discharging refrigerant") must be collected to a refrigerating machine. At this time, it is necessary to maintain the refrigerant supplied to the cooling portion (referred as "supplying refrigerant") at the cryogenic temperature, and is necessary to reduce an amount of use of the refrigerant which is costly. For example, in order to supply the supplying refrigerant from the refrigerating machine on a stationary side to the superconducting motor which is rotating, it is necessary to pass the supplying refrigerant from a stationary portion to a rotary portion by using a rotary joint, in which the stationary portion and the rotary portion are relatively rotating. In this rotary joint, a sealing device for sealing relatively rotating communication passages of a fluid passage with a fluid passage at the stationary portion and a fluid passage at the rotary portion, have a problem due to cryogenic temperature associated with the capability of sealing the refrigerant, in order to seal the supplying refrigerant at cryogenic temperature or the discharging refrigerant. Also, when temperature of the supplying refrigerant rises, the superconducting function cannot be achieved without increasing of the amount of the supplying refrigerant, because it cannot be cooled to a predetermined cryogenic temperature. Therefore, there is a problem to increase the amount of the supplying refrigerant to the cooling portion.

Further, it has been known that vacuum thermal insulation is excellent for thermal insulation at the time of supplying the supplying refrigerant. However, in order to perform the vacuum thermal insulation, it is difficult to maintain the supplying refrigerant at the cryogenic temperature without heightening a degree of vacuum of a space on an outer circumferential side enclosing the fluid passage. In order to maintain high vacuum for this vacuum thermal insulation, a vacuum sealing device for shutting off ambient air is necessary. In this vacuum sealing device, since the lubricating capability of seal faces are lost by the vacuum, the seal faces are worn out. As a result, the degree of vacuum which should be used for thermal insulation is lowered. There is a problem that the supplying refrigerant maintained at the cryogenic temperature cannot be supplied to the cooling portion due to a sealing capability of the sealing device. Under such condition, because it is necessary to supply a large amount of the supplying refrigerant to the cooling portion in order to maintain the cooling portion at the cryogenic temperature, it becomes a problem that a running cost of the supplying refrigerant which is costly is increased. Thus, an advantageous rotary joint is required.

In FIG. 9 of Japanese Patent Laid Open No. 2003-65477 (Patent Document 1) (although FIG. 9 is omitted here, numeral references in shapes of the Patent Document 1 are shown after the names of components), a cross sectional view of a cryogenic material transfer joint (26) for supplying the cryogenic fluid to a synchronous generating machine as "a synchronous machine comprising a gas transfer joint for cryogenic gas to a rotor provided with a superconducting coil" is shown. In this cryogenic material transfer joint 26, an insert tube 154 on the stationary side constitutes a non-contact seal by fitting a tip end 158 of the insert tube 154 into an inner circumferential face of an inlet tube 156 in non-contact status. However, in this non-contact seal, the insert tube 154 merely fits to the inner circumferential face of the inlet tube 156 in non-contact status. Therefore, when the cryogenic gas 157 supplied from a cryogenic cooling apparatus 190 flows into the inlet tube 156 through the insert tube 154, there is a risk that a part of the cryogenic gas 157 flows into the inside of a cylindrical housing 186 from a gap between the insert tube 154 and the inlet tube 156 which are fitted in non-contact status. Although the cylindrical housing 186 is maintained in vacuum condition, when the inlet cryogenic gas 157 flows into the cylindrical housing 186, the thermal insulation effect by the vacuum condition is decreased, because the degree of vacuum in the cylindrical housing 186 is lowered.

Also, because the cryogenic substance transfer joint 26 has a constitution that high temperature cooling gas 164 flows in an annular space between an outer circumference of the cooling inlet tube 156 in which the inlet cryogenic gas 157 flows and a cooling outlet tube 166, there is a risk that the temperature of the inlet cryogenic gas 157 which flows in the cooling inlet tube 156 rises due to the high temperature cooling gas 164.

Also, because a motion gap seal 162 disposed in a cylindrical casing 168 is provided as the inlet cryogenic gas 157 flows on an inner circumferential side and the high temperature cooling gas 164 flows in an outer circumferential side, there is a risk that quality of material deteriorates by the cryogenic temperature to lower the sealing capability. Particularly, in the constitution of the cryogenic substance transfer joint 26 which has low thermal insulation effect against the outside, because a large amount of inlet cryogenic gas 157 must be supplied to a super-conducting (SC) coil winding, there is a risk that the motion gap seal 162 deteriorates rapidly.

Further, although it is described that a magnetic fluid seal 176 provided in a cylindrical hosing 196 prevents the return gas 164 from leaking (refer to paragraph 0046), this structure is unclear. In the magnetic fluid seal 176 known so far, when the inside of the cylindrical housing 186 is vacuumized, the magnetic fluid is sucked into the cylindrical housing 186 so that the sealing capability of the magnetic fluid seal 176 is lowered. For this reason, the outside air flow 177 flows into the cylindrical housing 186 through the magnetic fluid seal 176, so that the degree of vacuum in the cylindrical housing 186 is lowered. When the degree of vacuum in the cylindrical housing 186 is lowered, the thermal insulation effect of the inlet cryogenic gas 175 cannot be obtained. In an ordinal magnetic fluid seal, it is difficult to maintain this high degree of vacuum.

In a conventional sealing means including the magnetic fluid seal device, because a space on the sliding face is vaccumized so that a lubricant on the sliding face is sucked, the sliding face is worn out. As a result, the air flow 177 and further retuning gas gradually flow into the cylindrical housing 186 through a space between seal faces, so that it becomes difficult to maintain the inlet cryogenic gas 157 below 30° K. of the cryogenic temperature. When the inlet cryogenic gas 175 cannot be maintained below 30° K., the superconducting effect of the superconducting coil (coil winding 34) cannot be achieved. Therefore, more flow amount of the inlet cryogenic gas 157 than ordinary flow amount necessary for the superconducting coil must be supplied to the superconducting coil side. In this real scene, because the cooling fluid such as helium and the like are costly, running costs of the synchronous generating machine and the like are increased.

Further, in FIG. 1 or FIG. 3 of Japanese Patent No. 3306452 (Patent Document 2) (although FIGS. are omitted here, numeral references in shapes of the Patent Document 2 are shown after names of components), cross sectional views of constitutions, in which a liquid helium injection pipe (1) is inserted into an inner circumferential face of a protruding portion (10) covered by a vacuum layer (2) in the similar way as the Patent Document 1, are shown. In the constitutions, a space is formed between the inner circumferential face of this inserted protruding portion (10) and an outer circumferential face of the liquid helium injection pipe (1). The liquid helium is sealed to be prevented from leaking to the outside by a seal (4) for shutting off a space on an outer circumferential side communicating with the space formed between the inner circumferential face of the inserted protruding portion (10) and the outer circumferential face of the liquid helium injection pipe (1). However, even this constitution of the Patent Document 2, as the Patent Document 1, it is difficult to seal the liquid helium of cryogenic temperature by the conventional seal (4) as similar with the patent document 1, because the liquid helium is cryogenic temperature. It causes various problems on the seal face to seal the liquid helium by the mere seal device with the ordinary constitution. Also, although it has the constitution that the vacuum layer (2) is encapsulated in a space on the outside of the pipe, the thermal insulation effect for a long period to the liquid helium cannot be achieved, because in the encapsulation constitution, the degree of vacuum is decreased with time.

Also, in the constitution that the inlet tube 156 is fitted to the insert tube 154 on the stationary side as shown in the Patent Document 1, or in the constitution that the liquid helium injection pipe (1) is fitted to the protruding portion (10) at the tip end of the rotor towards a bore center (19) (introducing bore) in the axial direction as shown in the Patent Document 2, it becomes difficult to fix the inlet tube 156 on the rotor side or the protruding portion (10) at the tip end of the rotor, so that there is a risk that, when the inlet tube 156 or the protruding portion 10 of the tip end of the rotor is in contact with the relative face, it slides with the insert tube 154 on the stationary side or the liquid helium injection pipe (1) to occur abrasion powders. Also, in this constitution, it is difficult to maintain the degree of vacuum. Further, when a plurality of liquid helium injection pipes (1) is necessary in response to a number of superconducting magnetic field coil, the rotor is complicated in response to numbers thereof to complicate the constitution of the seal device.

Patent Document 1: Japanese Patent Laid Open No. 2003-65477

Patent Document 2: Japanese Patent No. 3306452

DISCLOSURE OF INVENTION

Problems to be Solved by the Invention

The present invention has been made by considering above problems, an object of the present invention is to provide a fluid passage thermally insulated by the high vacuum condition, in which the supplying refrigerant is flowed, to the cryogenic supplying refrigerant to the cooling portion. Further, another object of the present invention is to prevent the sealing capability of a second mechanical seal device from deteriorating due to the supplying refrigerant, in which the second mechanical seal device communicates fluid passages from a fluid passage on the stationary side to a fluid passage on the rotary side. Also, an object of the present invention is to make communicated fluid passages efficient, the communicated fluid passages including a fluid passage on the stationary side connected with a refrigerating machine and a connecting fluid passage on the relatively rotating side. Further, an object of the present invention is to improve durability of a rotary joint in which the supplying refrigerant is flowed. Furthermore, an object of the present invention is to make assembling of pipes easier due to the constitution of the connecting fluid passages to make manufacturing of the fluid passage easier. Also, an object of the present invention is to improve cooling effect of the refrigerant to decrease a running cost of the refrigerant.

Means for Solving the Problems

A rotary joint of the present invention is a rotary joint for a refrigerant configured to connect fluid passages between a refrigerant supplying apparatus on a stationary side and a cooling portion on a rotary side, comprising: a vacuum use cylindrical shaft supported by a main body in rotatable condition, and having a vacuum passage penetrating in the axial direction, a coupling portion at one end of the vacuum passage for communicating the vacuum passage with a communication passage of the cooling portion, an opening at another end of the vacuum passage for vacuum suction, and a connecting portion at a middle of the coupling portion and the opening; a rotary seal ring hermetically fitted to the connecting portion of the vacuum use cylindrical shaft, and having seal faces at both end faces; a pair of stationary seal rings provided on both sides in an axial direction of the rotary seal ring, and having counter seal faces respectively contacting hermetically with the seal faces facing thereto; resilient bellows for pressing the stationary seal rings resiliently to the seal faces, and having a joint portion and a fixed portion respectively, the joint portion being provided at one end of the resilient bellows and being connected hermetically with an opposite face from the counter seal face of the stationary ring, the fixed portion being provided at another end of the resilient bellows, enclosing the vacuum use cylindrical shaft, and being fixed to the main body; a first spaced fluid passage formed between the resilient bellows sandwiching the rotary seal rings and communicated with a first fluid passage to introduce a supplying refrigerant; a second fluid passage penetrating through the rotary seal ring in the radial direction and communicated with the first spaced fluid passage; a connecting fluid passage provided in the connecting portion, communicated with the second fluid passage at one end of the connecting fluid passage, and having a connecting bore at another end of the connecting fluid passage; a first pipe arranged in the vacuum passage of the vacuum use cylindrical shaft, and having a fluid passage connected with the connecting bore at one end of the fluid passage to be communicated with the connecting fluid passage and communicated with a fluid passage on the cooling portion side at another end of the fluid passage; a connecting cover having a suction port for exerting the vacuum suction on the inside of the vacuum passage through the opening of the vacuum use cylindrical shaft, and a magnetic fluid seal device having a magnetic fluid seal cover, pole blocks, magnets, a shaft cover, and magnetic fluid, and wherein the magnetic fluid which magnetic force is exerted on shuts off a gap between a space between the projections and the pole blocks against the vacuum suction force, the magnetic fluid seal cover being hermetically coupled with the connecting cover to enclose the vacuum use cylindrical shaft, the pole blocks being for magnets, being arranged in parallel, and being hermetically fitted on one circumferential face of an inner circumferential face of the magnetic fluid seal cover or an outer circumferential face of the vacuum use cylindrical shaft, the magnets being arranged in spaces between the pole blocks arranged in parallel, the shaft cover having a projection group in which a plurality of projections are arranged in a manner that the respective projections are close to and facing to circumferential faces of the respective pole blocks and being fitted on another circumferential face of an inner circumferential face of the magnetic fluid seal cover or an outer circumferential face of the vacuum use cylindrical shaft, the magnetic fluid existing between the projections and the pole blocks.

According to the rotary joint having such constitution, a space in the inner circumferential face of the vacuum use cylindrical shaft is made in high vacuum condition to achieve a thermal insulation effect by a magnetic fluid seal device which is available to seal certainly against vacuum suction. Further, because the magnetic fluid seal device has no sliding face, durability can be exerted preventing rapid abrasion of the sliding face efficiently. Therefore, the inside of the inner circumferential face of the vacuum use cylindrical shaft can be maintained as high vacuum condition (less than $10^{-5}$Torr) for a long period (Note that, a seal face of conventional seal device wear outs rapidly, even though it has an advantageous sealing capability, because a lubrication liquid on seal faces which slides in the vacuum condition is sucked). Further, since a coupling portion of the vacuum use cylindrical shaft communicates with an internal space of a cooling portion by coupling with the connecting portion of the cooling portion, vacuum thermal insulation in the internal space of the cooling portion also can be made, by this vacuum suction. Therefore, since respective first pipe, second pipe and connecting portion provided in the inner circumferential face of the vacuum use cylindrical shaft can be thermally insulated by the vacuum efficiently against outside air, the supplying refrigerant can be maintained in cryogenic condition. Further, the vacuum thermal insulation in the inner circumferential face of the vacuum use cylindrical shaft is available to maintain the supplying refrigerant in liquid condition by maintaining the supplying refrigerant which flows in the spaced fluid passage as cryogenic temperature.

As a result, when the seal face and an opposite side counter seal face are sliding, it is possible to prevent heat generation by the sliding, because the liquid refrigerant exists between both seal faces. Also, abrasion of both seal faces can be prevented (in a conventional art, even though an advantageous seal device, sealing material is deteriorated, because the refrigerant is cryogenic temperature, and it has been difficult to seal the refrigerant). Further, the sealing capability against the supplying refrigerant is exerted by preventing abrasion of both seal faces when they are sliding.

Also, because a structure of the bellows which is integral with the stationary seal ring makes an O-ring to seal sliding fitting faces of the stationary seal ring unnecessary, it is available to prevent leakage of the refrigerant caused by the material changing of the O-ring by cryogenic temperature. Further, a structure of the resilient bellows resiliently pressing the opposite side counter seal face of the stationary seal ring to the seal face even in the cryogenic temperature, and because the movement for the resilient has no sliding face, sealing capability of the opposite side counter seal face can be exerted. Furthermore, the respective first pipe and second pipe are constituted by pipes, not by a fluid passage of a bore wherein a member being vacuum use cylindrical shaft is processed by a drill and the like, a pipe material having advantageous thermal insulation can be selected. Further, since the first pipe and second pipe are tubular pipe, it becomes easily processing, assembling the first pipe and the second pipe as well as pipe work becomes easier, thus processing cost and assembling cost as fluid passages can be reduced.

Preferably, in the rotary joint of the present invention, two sets of the rotary seal ring and the stationary rings of both sides of the rotary seal ring are arranged in the axial direction, a second spaced fluid passage is provided between adjacent stationary seal rings of one set and other set of the at least two sets, the second spaced fluid passage communicates with a second pipe arranged in the vacuum passage of the vacuum use cylindrical shaft, so that a discharging refrigerant after cooling the cooling portion is returned back through the second pipe and the second spaced fluid passage.

According to the rotary joint of the present invention having such constitution, since the second pipe is provided in the inner circumferential face of the vacuum use cylindrical shaft and is vacuum thermally insulated, the discharging refrigerant can maintain cryogenic temperature. Then, when the discharging refrigerant flows in the second spaced fluid passage, because it flows a space of which both ends are shut off by both bellows and the stationary seal ring, it is available to prevent the sealing capability of a second mechanical seal device from decreasing. Even though the discharging refrigerant flows between both sliding faces of the seal face and the opposite side counter seal face, it is possible to prevent the seal faces from becoming no lubricating status, because the discharging refrigerant acts on the inner circumferential side of the seal faces. Then, it is possible to exert durability of a second mechanical seal for a long period.

Preferably, in the rotary joint of the present invention, an inner circumferential portion of the connecting portion is formed as a circular face, an oval face, a convex-concave face or a toothed gear shape face along the circumferential direction, and a connecting bore is formed in the connecting portion at an end of the first pipe side.

According to the rotary joint of the present invention having such constitution, portions of various shapes such as a circular shape, an oval shape, concavity and convexity shapes of an inner circumferential face of connecting portion provided in the mechanical seal device of vacuum use cylindrical shaft may increase by providing the respective first pipe and the second pipe on a side face which extends to the inner circumferential side. Also, this structure makes it easy to provide the first pipe and the second pipe. Also, the shape of the inner circumferential face of the connecting portion makes vacuum suction easy and may exert an effect of vacuum thermal insulation for vacuum passage. Simultaneously, it is made easy to locate a connecting bore of the connecting portion in response to number of the first pipe and the second pipe. Then, even in case of coating the first pipe and the second pipe by a thermal insulation material, an interval of the first pipe and the second pipe becomes free. Then, a thickness of the coating can be realized as a true design, the thermal insulation effect can be achieved.

Also preferably, in the rotary joint of the present invention, the rotary seal ring comprises a plurality of the second fluid passages arranged along the circumferential direction, the connecting portion comprises the connecting fluid passages along the circumferential direction which communicate with the respective second fluid passages, and the fluid passages of respective the first pipes communicate with the connecting fluid passages respectively corresponding to thereof.

According to the rotary joint having such constitution, because a large number of second fluid passages can be provided on the rotary seal ring, the supplying refrigerant flowing from one first fluid passage may flow into a plurality of the second fluid passages through the first spaced fluid passage. Then, only a necessary amount of the supplying fluid can be provided to only necessary portions of the respective cooling portions, because the fluid passages of the respective first pipes communicate with a plurality of the connecting fluid passage which communicates with a plurality of the second fluid passage. Also, number of a set of second mechanical seal composed of both stationary seal ring and a rotary seal ring arranged can be decreased. Simultaneously, a length in an axial direction of the connecting portion can be shortened. As a result, a producing cost and an assembling cost for the second mechanical seal device and connecting components can be reduced significantly. Also, the rotary joint can be downsized.

BEST MODE FOR CARRYING OUT THE INVENTION

Below, a rotary joint of embodiments according to the present invention will be explained on the basis of drawings.

Figure 1:
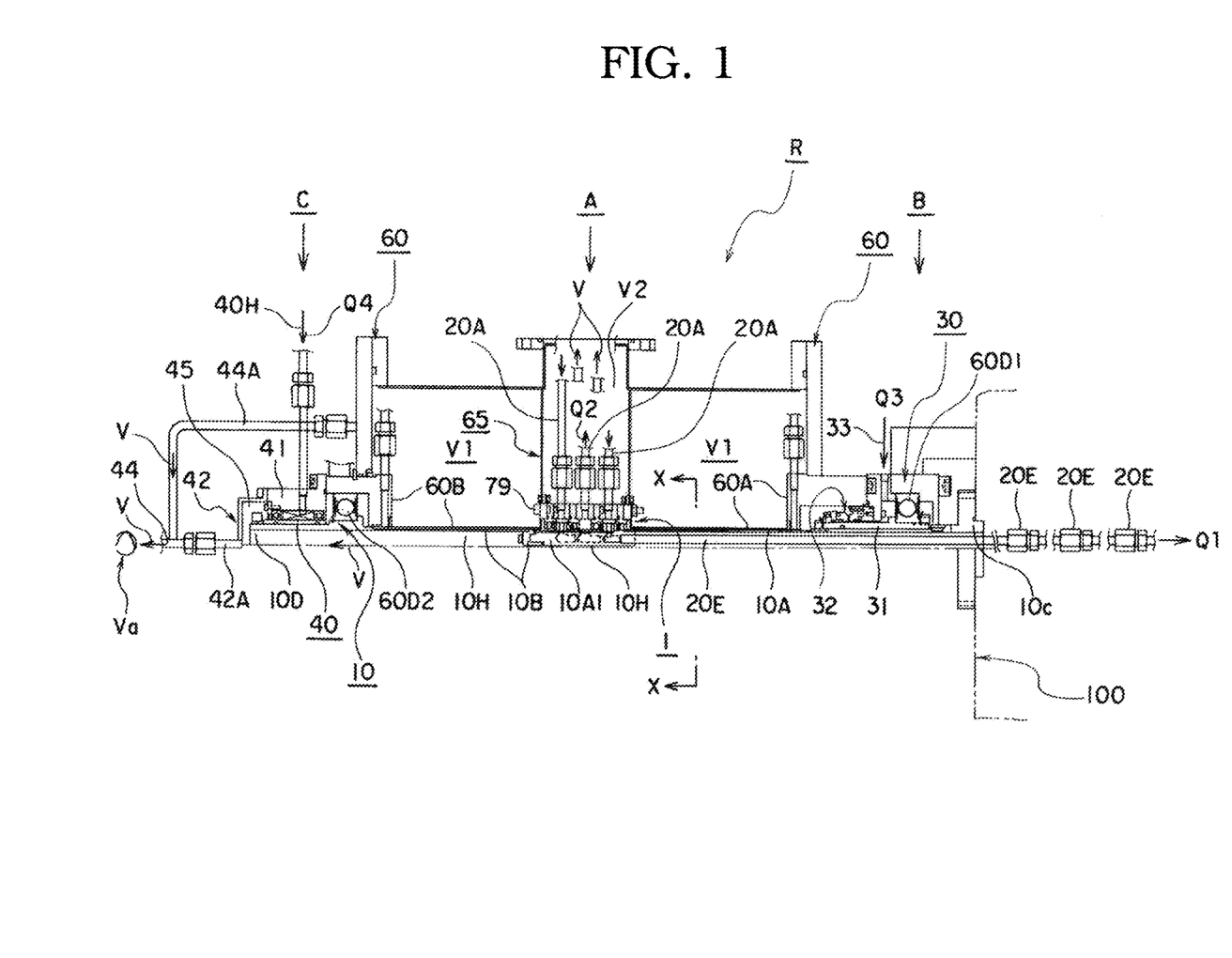
FIG. 1 is a schematic view of one side of a rotary joint of an embodiment 1 of the present invention.
Figure 2:
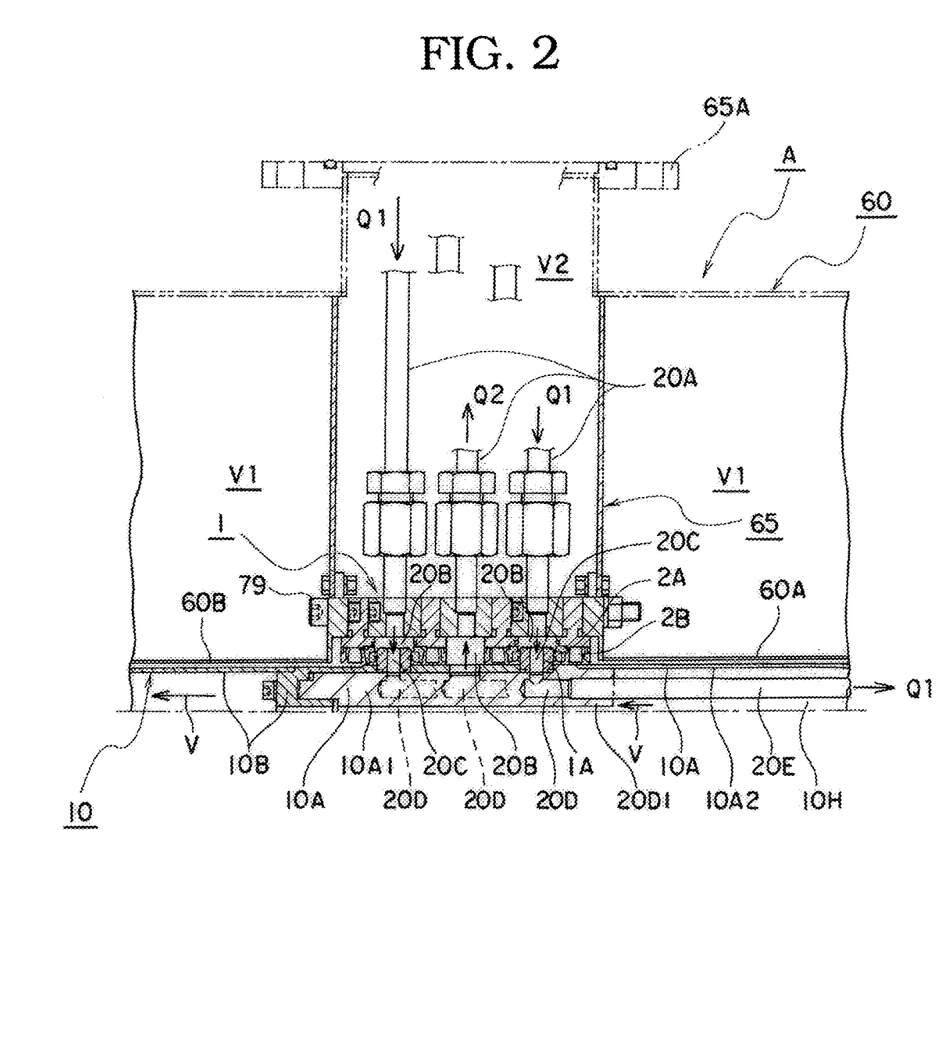
FIG. 2 is a schematic view of a first assembled body showing the vicinity of a mechanical seal device and pipes of FIG. 1.
Figure 3:
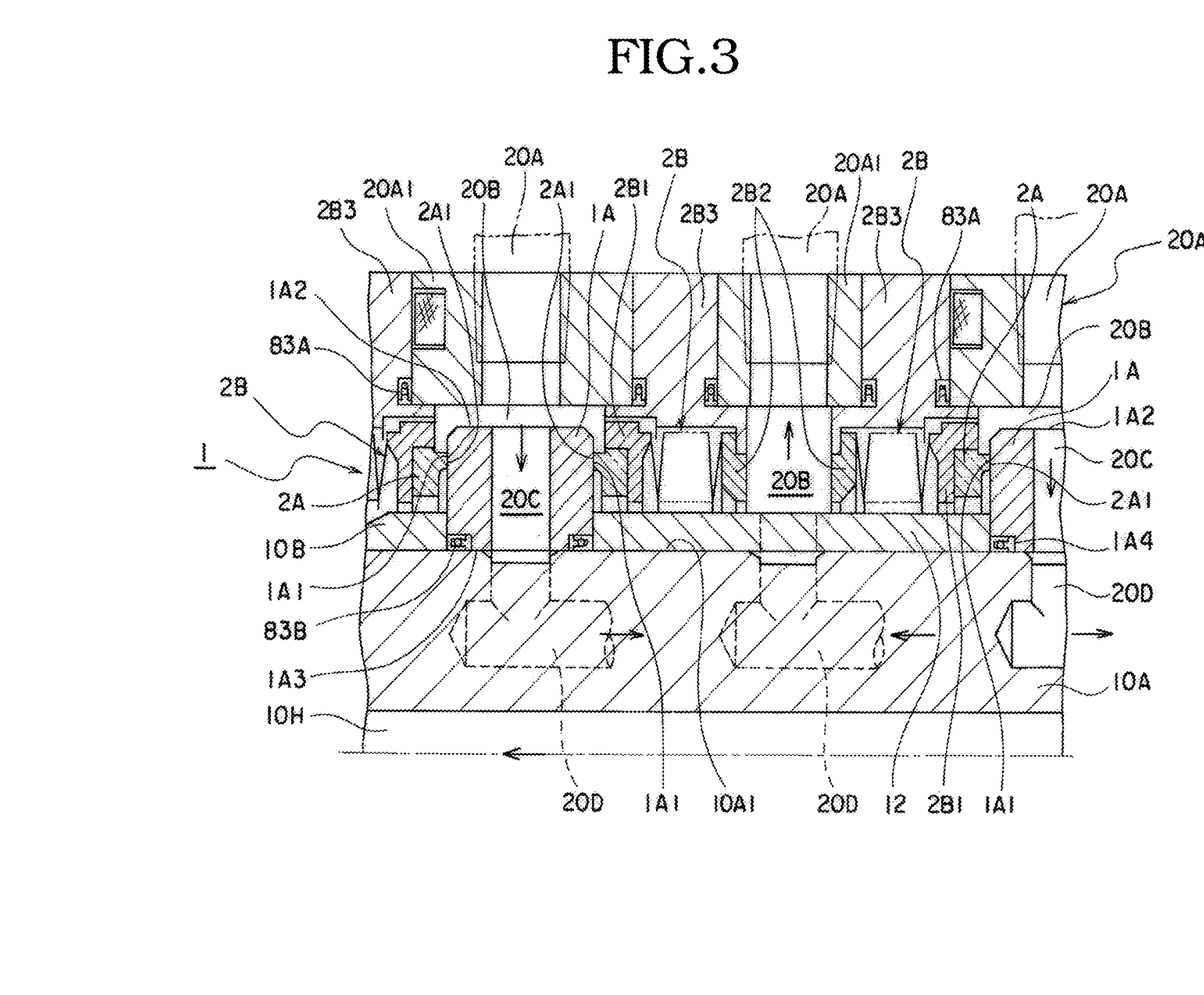
FIG. 3 is a schematic view showing constitutions of the vicinity of the respective second mechanical seal of FIG. 2.
Figure 4:
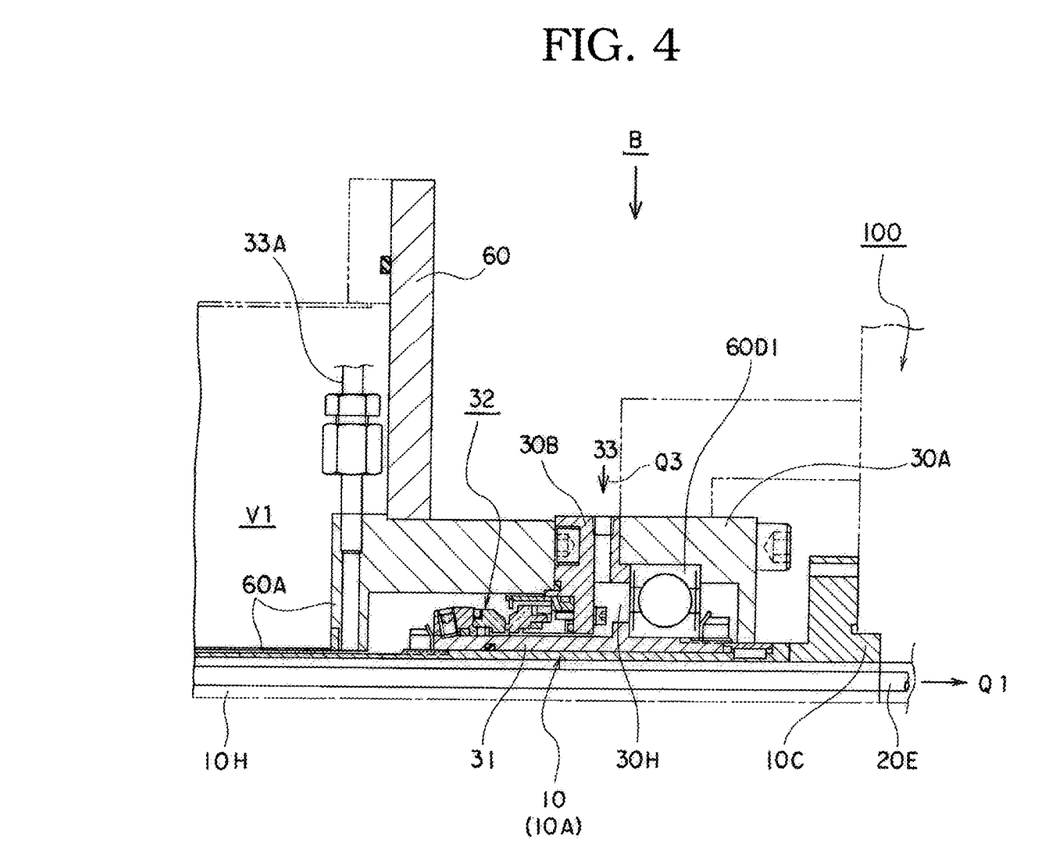
FIG. 4 is a schematic view of one side of a second assembled body of FIG. 1.
Figure 5:
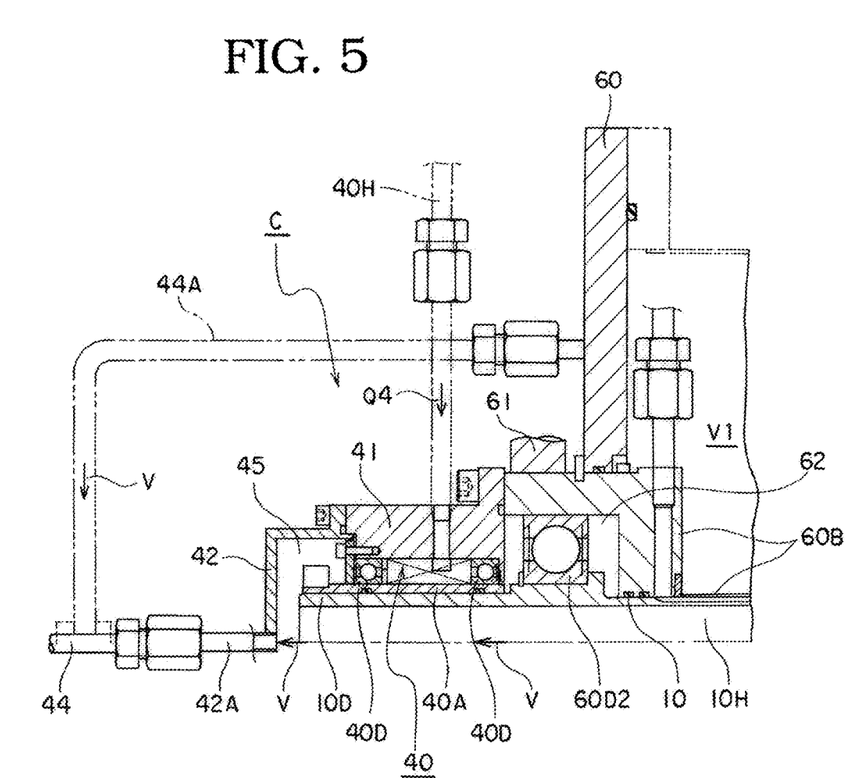
FIG. 5 is a schematic view of one side of a third assembled body of FIG. 1.
Figure 6:
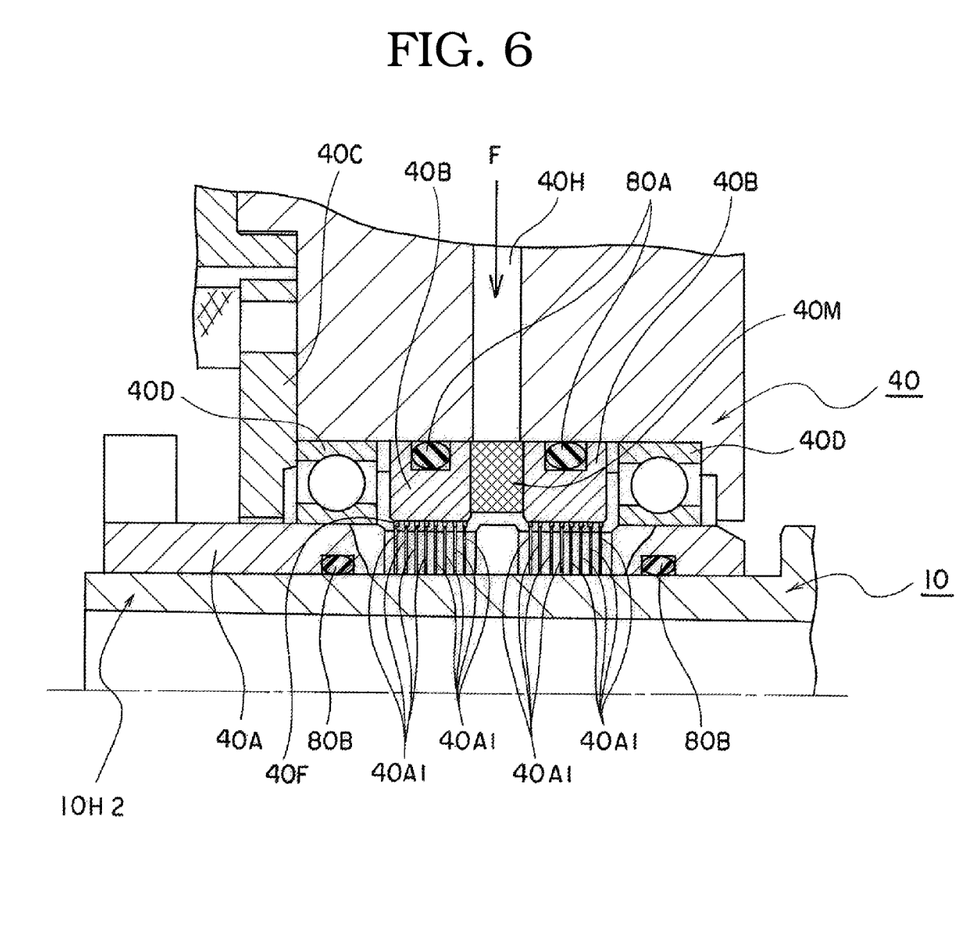
FIG. 6 is a schematic view of one side of a magnetic fluid seal shown in FIG. 5.

Note that, each drawing explained below are accurate drawings produced based on a design drawing. FIG. 1 is a schematic view of one side of a rotary joint "R" of an embodiment 1 of the present invention. Note that, in FIG. 1, hatchings are omitted, because the drawing will be unclear, if the hatching is illustrated in the cross sectional view. Also, FIG. 2 shows the vicinity of a mechanical seal device 1 and pipes of FIG. 1, and is a schematic view of one side of a first assembled body "A". Further, FIG. 3 is a further a schematic view showing a constitution of the vicinity of a second mechanical seal device 1 of FIG. 2. FIG. 4 is a schematic view of one side of a second assembled body "B" on a first bearing portion 60D1 side. FIG. 5 is a schematic view of one side of a third assembled body "C" on a magnetic fluid seal 40 side. FIG. 6 is a schematic view of the magnetic fluid seal 40 shown in FIG. 5.

Below, the rotary joint "R" of the present invention will be explained with reference to FIG. 1 to FIG. 6. A coupling portion 10C of the rotary joint "R" with a flange is coupled with a rotary shaft provided with a fluid passage of a synchronous rotary machine having a magnetic field coil, for example a rotary generator, a linear motor and the like and a rotary shaft 115 provided with a fluid passage of a superconducting motor 100 shown in FIG. 9.

Initially, the superconducting motor 100 of FIG. 9 coupled with the rotary joint "R" of FIG. 1 will be explained. Further, with respect to the superconducting motor 100 which is not a present invention, it will be explained briefly.

Figure 9:
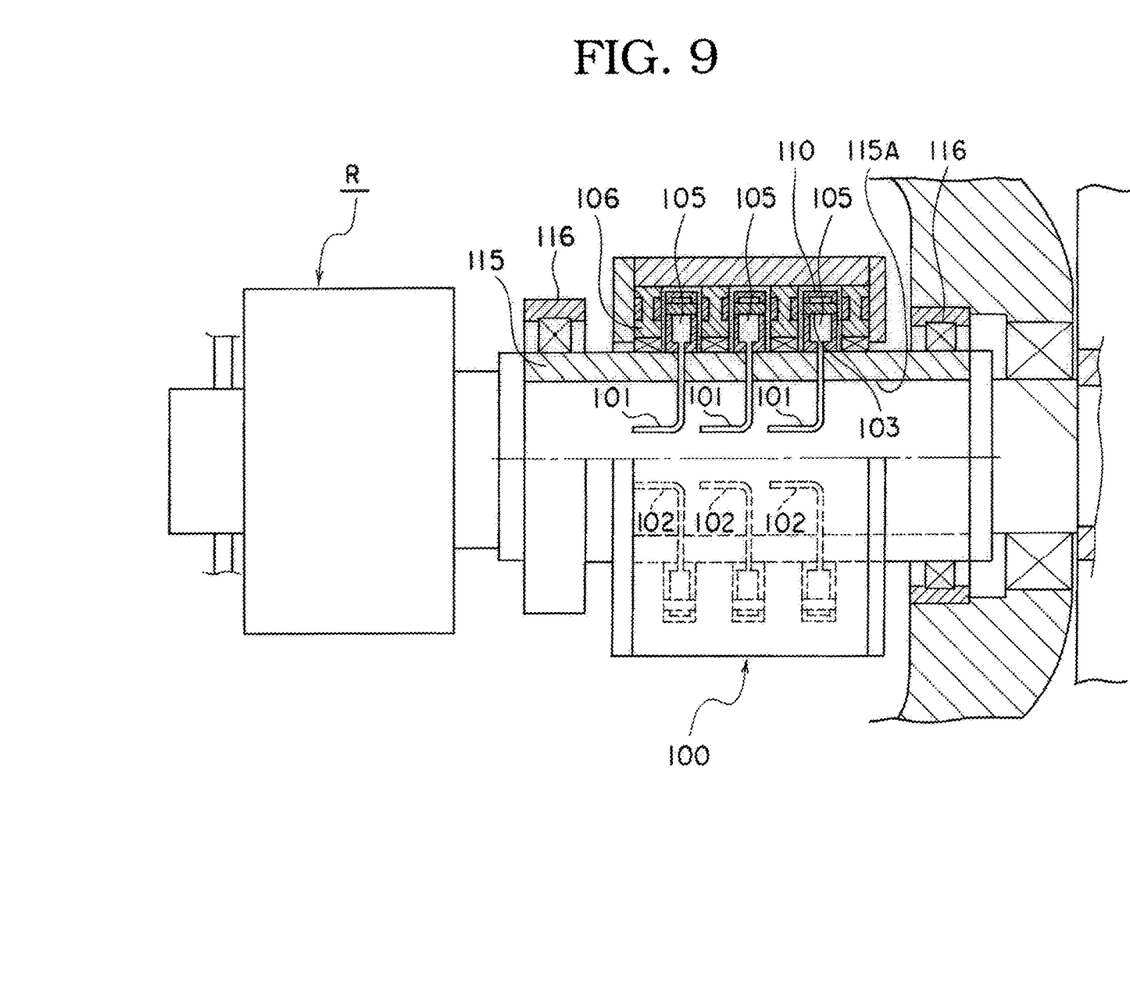
FIG. 9 is a schematic cross sectional view of a superconducting motor to which a rotary joint according to the present invention is mounted.

The superconducting motor is shown in FIG. 9 as a schematic view. Three rotors 110 (shown with only one reference numeral) are provided on an outer circumferential face of the rotary shaft 115 having cylindrical shape provided with an inner circumferential face 115A. Stators 106 (shown with only one reference numeral) which are four in total, are arranged on both sides of the rotors 110 in the axial direction. Then, for the respective rotors 110, cooling portions 105 having spaces on inner circumferential sides of superconducting (SC) coils 103 are provided. To the respective cooling portions 105, first tubes 101, 101, 101, communicating with respective first pipes 20E of the rotary joint "R" which are available to supply the refrigerant. The respective superconducting coils 103, 103, 103 (shown with only one reference numeral) are cooled by the refrigerant supplied to the corresponding cooling portions 105, 105, 105 through the respective first tubes 101, 101, 101. Also, the refrigerant after the cooling of the respective superconducting coils 103, 103, 103 is flowed back to a refrigerant supplying apparatus (also called as a refrigerator) which is not shown, through a second pipe 20E communicating with the respective second tubes 102, 102, 102 as discharging fluid passages. Note that, bearings 116, 116 are provided on both sides of the rotary shaft 115. Though the case with three rotors 110 has been conveniently explained here, it is not limited to three, but it may be one, two, or three or more. Also, with respect to a constitution of the rotor, there exist constitutions different from the constitution of the exemplified rotor 110. At any rate, however, in order to close an electric resistance of the superconducting coil to zero (0) in a synchronous rotary machine, it is necessary to cool the superconducting coil to the cryogenic condition. The present invention solves this problem.

These high temperature superconducting coils must be cooled to, for example, a critical temperature (superconducting transition temperature, for example, 27K) or less, in order to achieve superconducting and to maintain the superconducting. The rotary joint "R" of the present invention has a constitution in which the cryogenic supplying refrigerant "Q1" can be supplied from the stationary side directly to the respective cooling portions 105 through respective connecting fluid passages 20D, 20D of the rotary side. Then, because the supplying refrigerant "Q1" or a discharging refrigerant "Q2" are flowed through a fluid passage in the first pipe 20E or the second pipe 20E arranged in a vacuum passage 10H which is in the high vacuum condition (the high vacuum is within the range from $10^{-3}$Torr to $10^{-7}$Torr), it is possible to maintain the supplying refrigerant "Q1" at the cryogenic temperature which is the critic temperature or lower by the vacuum thermal insulation from ambient air. Then, the first pipe 20E and the second pipe 20E are maintained in the high vacuum condition to shut off heat transfer from the ambient air.

In FIG. 1 and FIG. 9, the coupling portion 10C of a vacuum cylindrical shaft 10 is formed to be coupled with an attaching portion at one end of a rotary shaft 115 of the superconducting motor 100 so as to rotate together. Simultaneously, the first pipe 20E is coupled with the first tube 101 to provide a supplying fluid passage which makes available to supply the supplying refrigerant "Q1" from the first pipe 20E to the inside of the first tube 101. Further, the second pipe 20E is also coupled with the second tube 102 to provide a discharging fluid passage which makes available to discharge the discharging fluid "Q2" used for cooling the superconducting coil and the like from the second tube 102 to the second pipe. Note that, this first pipe 20E is not limited to the supplying fluid passage of the supplying refrigerant "Q1", also the second pipe 20E is not limited to the discharging fluid passage of the discharging refrigerant "Q2". The first pipe 20E can be used for the discharging fluid passage. Further, the second pipe 20E can be selected as the supplying fluid passage. However, when the used discharging refrigerant "Q2" is flowed back to the refrigerant supplying apparatus, it is preferable to use the second pipe 20E in the embodiment of the second mechanical seal device 1 of FIG. 1.

This vacuum use cylindrical shaft 10 connects a connecting portion 10A1 (it is also called a connecting part. However, it does not mean the connecting part is another component from the vacuum cylindrical shaft) of a first vacuum use cylindrical shaft 10A that whole body thereof is made of stainless steel and a coupling portion (reference numeral is 10B1) of a second vacuum use cylindrical shaft 10B and couples those by a bolt, which is shown in the Figure, but whose numeral reference is omitted, in the axial direction. In the first vacuum use cylindrical shaft 10A, an end portion of the cylindrical shaft and a face with a step of the connecting portion 10A1 are fitted and circumferential faces of the fitting portion are welded to integrate those. Also, in a second vacuum use cylindrical shaft 10B, an end portion of the cylindrical shaft and a face with a step of the coupling portion 10B1 are fitted to weld those fitted faces. These welded coupling portion 10B1 and connecting portion 10A1 are fitted and coupled by a bolt to form a cylindrical shape. This coupling of the first vacuum use cylindrical shaft 10A and the second vacuum use cylindrical shaft is fastened by the bolt so as to make available to mount the second mechanical sealing device 1. However, as another example, the mechanical seal device 1 is fitted to a long sleeve which is not shown and the sleeve is fitted on an outer circumference of the vacuum use cylindrical shaft 10, so that the first vacuum use cylindrical shaft 10A and the second vacuum use cylindrical shaft 10B can be integrated without divisionally assembling. In this embodiment, the connecting portion 10A1 is integrally fitted to an inner circumferential face of the first vacuum use cylindrical shaft 10A. Alternatively, the first vacuum use cylindrical shaft 10A may be processed to form the connecting portion 10A1. Note that, the second mechanical seal device means a seal device formed by assembling the rotary seal ring 1A and stationary seal rings 2A, 2A integrally, in which the stationary seal rings are arranged at both sides of the rotary seal ring 1 A as a pair. Then, a whole of combined pluralities of the second mechanical seal devices is called the mechanical seal device 1.

Also, in the connecting portion 10A1, a L-shaped connecting fluid passage 20D having cross sections in the radial direction and in the axial direction is provided as designated numbers along the circumferential direction with changing the position in the axial direction. Openings on the end portion side in an axial direction of the respective connecting fluid passages 20D, 20D are formed as connecting bores 20D1, and end portions of the first pipe 20E and the second pipe 20E are hermetically fitted to the respective connecting bores 20D1 (fitted circumferential faces are sealed by welding or bonding). The first pipe 20E and the second pipe 20E having supplying or discharging fluid passages are arranged in the inner circumferential face 10A2 of the first vacuum use cylindrical shaft 10A so as to make available to flow the cryogenic refrigerant "Q1" and "Q2". Simultaneously, the first pipe 20E and the second pipe 20E arranged in the inner circumferential face 10A2 of the first vacuum use cylindrical shaft 10A is provided in the high vacuum space where vacuum suction are executed (vacuumized) to be vacuum thermally insulated from the outside. Note that, for materials for the first pipe 20E and the second pipe 20E, stainless steel pipe, copper pipe, aluminium pipe, boron nitride pipe, silica pipe, reinforced glass pipe, law temperature resin (PTFE) pipe, etc. are used. Further, outer circumferential faces of the first pipe 20E and the second pipe 20E may be covered by a thermal insulation material. For example, an outer circumference of the stainless pipe is covered by materials such as PTEF, glass, silica and the like with a thickness which is available to get the thermal insulation. These thermal insulation effects can be achieved by providing the first pipe 20E and the second pipe 20E in the vacuum use cylindrical shaft 10 in the vacuum thermal insulation condition. These effects cannot be achieved by the conventional constitution in which a fluid passage for a refrigerant is formed by drilled hole on a housing body with a mechanical seal device.

FIG. 2 and FIG. 3 are enlarged views of the first assembled body "A" shown in FIG. 1. As shown in FIG. 2 and FIG. 3, the inner circumferential faces 1A3 of the rotary seal rings 1A are fitted on an outer circumferential face of the connecting portion 10A1 of the vacuum use cylindrical shaft 10, and are arranged in two lines spaced in the axial direction. Assembling of the rotary seal rings 1A are performed by sandwiching a cylindrical spacer 12 between the both rotary seal rings 1A, 1A arranged in parallel, and fixing both outside ends in the axial direction of the rotary seal rings 1A, 1A in the condition that the outside ends are supported by the face with the step of the connecting portion 10A1 and an end face of the coupling portion 10B1 of the second vacuum use cylindrical shaft 10B. In the respective rotary seal rings 1A, 1A, seal faces 1A1, 1A1 are provided at both end faces in the axial direction, and a second fluid passage 20C penetrating the seal ring from the inside to the outside is provided at an intermediate of the both seal faces 1A1, 1A1. This second fluid passages 20c are connected to inward connecting fluid passage 20D. This respective rotary seal rings 1A and respective stationary seal rings 2A to mention later are made of material which is rigid without wearing out such as silicon carbide, carbon, rigid alloy, composite resin and the like, and which has cold resistance to resist to the refrigerant "01", "Q2".

A pair of both stationary seal rings 2A, 2A is provided at both sides in an axial direction of the rotary seal ring 1A.

Simultaneously, a joint portion 2B1 which becomes one end of a resilient bellows annularly surrounding the vacuum use cylindrical shaft 10 is joined at a counter side face (back face) of a counter seal face 2A1 as hermetically sealed by welding and the like. The resilient bellows 2B is metallic such as stainless steel, nickel base alloy (Inconel 718) and the like, and is an attached component integrally formed with the stationary seal ring 2A. Also, an annular fixed portion 2B2 of another end of the resilient bellows 2B is bonded as hermetically sealed by welding and the like to a gapped portion of an inner circumference of a seal cover 2B3. Then, the resilient bellows elastically presses the counter seal face 2A1 of the stationary seal ring 2A in the direction to make the counter seal face 2A1 in hermetically contact with the seal face 1A1.

Further, a space between an outer circumferential face 1A2 of the rotary seal ring 1A and the stationary seal rings 2A, 2A of both sides of the rotary seal ring 1A (a space between the both resilient bellows 2B, 2B) is formed on a first spaced fluid passage 20B. The first spaced fluid passage 20B communicates with the first fluid passage 20A to which a pipe coupling portion 20A1 is provided. Note that, the first fluid passage 20A is a fluid passage to which the supplying refrigerant "Q1" is introduced from the refrigerant supplying apparatus. Also, a facing space between fixed portions 2B2, 2B2 of the both resilient bellows 2B, 2B between the both rotary seal ring 1A, 1A, and an annular space formed between an outer circumferential face of the spacer 12 and the inner circumferential face of the pipe coupling portion 20A1 (numeral reference is omitted in FIG. 3) is the second spaced fluid passage 20B. This second spaced fluid passage 20B directly communicates with a connecting fluid passage 20D because it does not communicates through a second fluid passage 20C provided on the rotary seal ring 1A. Namely, a first spaced fluid passage 20B which communicates with the second fluid passage 20C of the rotary seal ring 1A and the second spaced fluid passage 20B which does not communicates through the second fluid passage 20C are provided between the second spaced fluid passage 20B and the connecting fluid passage 20D.

Seal rings 83A having C-shape or U-shape cross section are provided at connecting portions between respective ring shape seal covers 2B3, 2B3, 2B3, 2B3 and ring shape pipe coupling portions 20A1, 20A1, 20A1 to seal the respective connecting portions (in FIG. 3, 8 seal rings are provided in the axial direction). These seal rings 83A are constituted in a shape that an elastic hollow O-ring composed of metal (Inconel 718 and the like material) is provided in an u-shaped groove composed of PTFE or in a shape of C-shape metal ring, and are made with cold resistance to resist the refrigerant "Q1", "Q2". Then, those seal covers 2B3 and pipe coupling portions 20A1 are sandwiched between a flange portion welded at an end portion of a first outer cylinder 60A and a flange portion welded at an end portion of a second outer cylinder 60B, and fastened by the bolt 79 (refer to FIG. 1 or FIG. 2) to form a cover which covers an outer circumferential face side of the second mechanical seal device 1. Also, the respective pipes communicating with the first fluid passages 20A of the respective pipes coupling portions 20A1 are formed by resin pipes, steel pipes (stainless steel pipes and the like) so as to communicate with the cooling fluid supplying apparatus which is not shown through the inside of a second vacuum chamber V2 of a second main body 65. The respective pipes may be used for the vacuum suction by connecting with a branch pipe 44A shown in FIG. 5.

Then, the supplying refrigerant "Q1" supplied to the cooling portion 105 through the respective fluid passages 20C provided to the respective rotary seal rings 1A, is the cryogenic liquid helium, cryogenic liquid nitrogen and the like. Also, the discharging refrigerant "Q2" flowed back to the cooling fluid supplying apparatus through the second spaced fluid passage 20B is a refrigerant after cooling the cooling portion 105 (there is a case that the refrigerant is evaporated). Note that, kinds of the supplying refrigerant "Q1" is liquid helium (−273° or below), liquid nitrogen (−196° or below), liquid neon, liquid argon and the like. These supplying refrigerant "Q1" is cooled at cryogenic temperature which is available to cool the superconducting coils and the like to make the superconducting condition. In the second cooling chamber V2 of the second main body 65 is high vacuum status and is available to make vacuum thermal insulation to the respective first fluid passages 20A. The second cooling chamber V2 is vacuumized through the branch pipe 44A. Also, it is available to prevent temperature of the supplying refrigerant "Q1" from rising by covering circumference of pipe of the branch pipe 44A, the first fluid passage 20A and the like with a thermal insulation material of a fiber reinforced resin such as PTFE and the like. Further, the cylindrical second main body 65 arranged in the radial direction to the vacuum use cylindrical shaft 10, is coupled hermetically with a mounting plate provided at the flange portion of the first outer cylinder 60A and a mounting plate provided at the flange portion of the second outer cylinder 60B by using a bolt as shown in FIG. 2. Then, although the second main body 65 is formed in a cylindrical shape that the radial direction thereof is arranged in the first main body 60, if a large number of the first fluid passages 20A exist, it may be formed as a cylindrical body hermetically enclosing an axial core of the vacuum use cylindrical shaft 10.

An inner diameter of the inner circumferential face of the first outer cylinder 60A is formed larger than an outer diameter of the first vacuum use cylindrical shaft 10A as shown in FIG. 1 or FIG. 2 and FIG. 4. And the first outer cylinder 60A is fitted to the first vacuum use cylindrical shaft 10A with providing an annular space. Also, the second outer cylinder 60B is fitted to the second vacuum use cylindrical shaft 10B with providing an annular space, and formed in an almost symmetrical shape to the first outer cylinder 60A. Next, as shown in FIG. 4, a vacuum suction pipe 33A is provided at a large diameter cylindrical end portion 60A of the first outer cylinder 60A to exert vacuum thermal insulation on the space around the first mechanical seal device 32 by vacuum suction and also to exert vacuum thermal insulation on the annular space on the outer circumference of the vacuum use cylindrical shaft 10. For this vacuum suction pipe 33A, a plurality of penetrating bores are provided with uniform assignment or non-uniform assignment along a circumferential face of the large diameter cylindrical end portion 60A. The vacuum suction pipe 33A is coupled with these penetrating bores. Another end of the vacuum suction pipe 33A connects with a vacuum suction apparatus (also called "vacuum pump") "Va" through the insides of the first vacuum chamber V1 and the second vacuum chamber V2. Note that, the first outer cylinder 60A is made of stainless steel, nickel base allow and the like as similar with the vacuum use cylindrical shaft 10.

In the second outer cylinder 60B shown in FIG. 1 or FIG. 2 and FIG. 5, as similar with the first outer cylinder 60A, a plurality of penetrating bores connecting with couplings of vacuum suction pipe are provided. The penetrating bores connecting with the vacuum suction pipe are provided with uniform assignment or non-uniform assignment along a circumferential face of the large diameter cylindrical end portion. Then, the annular space on the outer circumference of the second vacuum use cylindrical shaft 10B is vacuumized to exert the vacuum thermal insulation over the second vacuum use cylindrical shaft 10B. Then, another end portion of the vacuum suction pipe is connected with the pipe provided in the second main body 65 to be vacuumized by the vacuum suction apparatus "Va" as similar with the vacuum suction pipe 33A shown in FIG. 4.

Further, in the cylindrical first main body 60 having the first vacuum chamber V1 inside, the vacuum thermal insulation is exerted by the first vacuum chamber V1 enclosing the outer circumferential side of the vacuum use cylindrical shaft 10, and also the vacuum thermal insulation is exerted on the outer circumferential side of the second mechanical seal device 1. Also, on the second mechanical seal device 1, the first fluid passage 20A, the first and the second spaced fluid passage 20B, the second fluid passage 20C, and the connecting fluid passage 20D, the vacuum thermal insulation is exerted doubly by the second vacuum chamber V2 in the second main body 65. Also, even if the supplying refrigerant "Q1" leaks outward from the first spaced fluid passage 20B being through the second mechanical device 1 and the like by a reason that the rotary joint "R" reaches the durable period, it is prevented that the supplying refrigerant "Q1" leaking outward causes a pollution problem, because the supplying refrigerant "Q1" is sucked by the second vacuum chamber "V2".

Next, a second assembled body "B" is provided on the superconducting motor 100 side of the vacuum use cylindrical shaft 10 to the first assembled body "A" in FIG. 1. The second assembled body "B" is shown in FIG. 4 in an enlarged view. In a first bearing portion 60D1 which supports the vacuum use cylindrical shaft 10 in rotatable condition at one side thereof, an outer circumferential face thereof is fitted to an inner circumferential face of a first bearing box 30A. Also, the first bearing portion 60D1 is provided by fitting an inner circumferential face thereof to an outer circumferential face of the sleeve 31. Further, the sleeve 31 is fitted to an outer circumferential face of the vacuum use cylindrical shaft 10. Also, the first bearing box 30A is mounted and fixed to a case of the superconducting motor 100 by a retainer shown by a virtual line. Still further, a retaining plate 30B is provided on a side face of the opening of the first bearing box 30A which retains the first mechanical seal device 32 and supports the first bearing portion 60D1 in the axial direction. Fluid "Q3" such as air, lubricating fluid and the like is supplied into a fluid space 30H and on the first bearing portion 60D1 side through a supplying passage 33 provided on this supporting plate 30B. The fluid "Q3" flows from the supplying passage 30 into the fluid space 30H to act as buffer fluid to the first mechanical seal device 32. Also, it is available to supply the lubricating fluid to the bearing portion 60D1 to exert the lubricating action.

A rotary seal ring (numeral reverence is omitted) of the first mechanical seal device 32 is fitted to a sleeve 31 made of stainless steel by accompanying components. Also, a stationary seal ring relatively rotating with the rotary seal ring is retained at a bore with a step of the retaining plate 30B by accompanying components. Then, the fluid space 30H on the first bearing portion 60D1 side and the annular space in the first outer cylinder 60A are shut out by the first mechanical seal device 32. The large diameter cylindrical end portion 60A on the retaining plate 30B side of the first outer cylinder 60A is fitted to the inner circumferential face of the first main body 60, and the flange portion at another side is coupled to the second main body 65 by the seal cover 2B3 mentioned above.

A third assembled body "C" is provided at an opposite side to the second assembled body "B" of the cylindrical body for vacuum 10, as shown in FIG. 1. At the large diameter cylindrical end portion 60B of the second outer cylinder 60B fitted to the inner circumferential face of the first main body 60, the second bearing portion 60D is provided at a bore with a step of an inner circumference thereof to support the vacuum use cylindrical shaft 10 at the other side thereof. Further, the large diameter cylindrical end portion 60B is supported by a plurality of support 61. An inner circumferential face of a second bearing portion 60D2 is fitted to an outer circumferential face of the second vacuum use cylindrical shaft 10B (refer to FIG. 1). Then, the vacuum use cylindrical shaft 10 is supported in rotatable condition by the first bearing portion 60D1 and the second bearing portion 60D2. In a space formed on the side of the second bearing portion 60D2, though it is not shown in the drawings, a supplying passage is communicated as similar with the case shown in FIG. 4. A magnetic fluid seal cover 41 made of non-magnetic material such as stainless steel and the like is coupled at the end portion of the second outer cylinder 60B by a bolt whose numeral reference is omitted. The magnetic fluid seal device 40 shown in FIG. 6 is mounted between an inner circumferential face of the magnetic fluid seal cover and the outer circumferential face of the second vacuum use cylindrical shaft 10B. High accuracy bearings 40D, 40D are provided at both sides of the magnetic fluid seal device 40 in the inner circumferential face of the magnetic fluid seal cover 41. Inner circumferential faces of the both bearings 40D, 40D are fitted to a shaft cover 40A of the magnetic material, and outer circumferential faces thereof are fitted to an inner circumferential face of the magnetic fluid seal cover 41. Further, the shaft cover 40A is fitted to the outer circumferential face of the second vacuum use cylindrical shaft 10B with O-rings 80B, 80B with cold resistance characteristics arranged in parallel therebetween.

Then, two lines of sealing projection groups with a certain interval in the axial direction are provided on an outer circumferential face of the shaft cover 40A made of a magnetic material. The respective sealing projection groups have a predetermined number of projections 40A1 between 6 to 20 provided within a predetermined width in the axial direction, in which each projection has a ring shape and a section thereof is a mountain shape. Preferably, 8 to 15 projections may be provided respectively. At positions corresponding to the two lines of sealing projection groups, pole blocks 40B, 40B made of the magnetic material are fitted to the inner circumferential face of the magnetic fluid seal cover 41 with O-rings 80A for sealing. Spaces between outer circumferential faces of the respective 8 projections 40A1 . . . and inner circumferential faces of the pole blocks 40B, 40B are formed at contactless minute space of 0.05mm or less (close to the inner circumferential face without contact). The space can be realized by the high accuracy two bearings 40D, 40D at both sides. Then, permanent magnets 40M are provided with fitting between the two pole blocks 40B, 40B. Also, high accuracy magnetic fluid 40F exists between the seal projection groups 40A1, 40A1 and the inner circumferential faces of the pole blocks 40B, 40B. Further, a magnetic flux is formed by the permanent magnet 40M in a loop circuit formed in an annular shape by the permanent magnet 40M, the two pole blocks 40B, 40B and the two seal projection groups 40A1, 40A1. Then, the magnetic fluid 40F gathers at spaces between the projections 40A1 of the respective seal projection groups and the inner circumferential faces of the pole blocks 40B, 40B to shut off both sides of the minute spaces in the axial direction against suction force of the vacuum suction "V", so that the high vacuum condition of a suction space 45 is maintained without generation of the sliding resistance.

A fluid supplying passage 40H is provided on an outer face of the permanent magnetic 40M (not limited to the permanent magnet, but it is magnet) of the magnetic fluid seal cover 41 in the penetrating status. Then, the permanent magnet 40M is kept warm by a supplied fluid "Q4" of $N_2$ gas or a supplied fluid "Q4" of air. Alternatively, as a supplied fluid "F", it is made available to supply the magnetic fluid 40M from the fluid supplying passage 40H into the inside of the inner circumferential face of the pole blocks 40B, 40B. There are cases that the permanent magnet 40M formed in a ring shape is sandwiched between the pole blocks 40B, 40B, or large number of the permanent magnet formed in a cylinder shape are arranged between the pole blocks 40B, 40B. Further, a cross section shape of the outer circumferential faces of the projections 40A1 is preferably formed in a sharp mountain shape or a "M" shape. This magnetic fluid seal device 40 is constituted so as to make available to maintain high vacuum condition or higher vacuum condition by shutting off the vacuum passage 10H in the vacuum use cylindrical shaft 10 against the outside. Note that, it may be constituted that the shaft cover 40A is mounted on the inner circumferential face of the magnetic fluid seal cover 41 by mounting the pole blocks 40B, 40B and the magnet 40M on the outer circumferential face of the vacuum use cylindrical shaft 10. Then, the high accuracy magnetic fluid 40F is interposed between the seal projection groups 40A1, 40A1 and the inner circumferential faces of the pole blocks 40B, 40B. Namely, it is a constitution in which the inside and the outside are reversed to the above mentioned embodiment 1, and that is a constitution of the magnetic fluid seal device 40 that inner circumferential side components are arranged on the outer circumferential face side, and outer circumferential side components are arranged on the inner circumferential. Note that, number of paralleled seal projection groups and pole blocks paralleled may be one, if the magnetic circuit can be formed between the both components.

A coupling cover 42 facing to an opening portion 10D of the second vacuum use cylindrical shaft 10B is hermetically fitted on an end face in an axial direction of the magnetic fluid seal cover 41 (it may be fitted anywhere the vacuum use cylindrical portion is enclosed). A suction bore 42A is provided at a position facing to the opening portion 10D of the coupling cover 42. The suction bore 42A communicates through a suction pipe 44 with the vacuum suction apparatus (vacuum pump) "Va" shown in FIG. 1. Further, the first vacuum chamber "V1" is sucked through the branch pipe 44A branched from the suction pipe 44 and coupled to the pipe penetrating to the inside of the first main body 60, so that the first vacuum chamber "V1" is maintained in the high vacuum condition. This high vacuum condition in the first vacuum chamber "V1" exerts the vacuum thermal insulation doubly to the second vacuum chamber "V2" of the second main body 65 which exerts the vacuum thermal insulation to the first fluid passages 20A, 20A, 20A.

On the other hand, the inside of the inner circumferential face 10A2 of the vacuum use cylindrical shaft 10 is sucked from the suction bore 42A to cause the inside of the vacuum passage 10H in the high vacuum condition. With respect to this high vacuum in the vacuum passage 10H, the inside of the inner circumferential face 10A2 can be made in high vacuum condition ($10^{-3}$Torr to $10^{-7}$Torr) or ultra vacuum condition ($10^{-7}$Torr or less) mentioned above, because the inside of the inner circumferential face 10A2 (vacuum passage 10H) of the vacuum use cylindrical shaft 10 is completely sealed by the high performance magnetic fluid seal device 40. Note that, though, in order to make the electro resistance of the superconducting magnetic field coil at zero(0), it is necessary to make a space which is the inside of the vacuum passage 10H and the outside of the first pipe 20E or the second pipe 20E, and which is for flowing the supplying refrigerant "Q1", in the vacuum condition of $10^{-3}$Torr or less, or preferably $10^{-5}$Torr or less, the high vacuum condition can be made by the magnetic fluid seal device 40 of the present invention which shuts off the inside of the vacuum passage 10H efficiently against the outside thereof. This high vacuum condition or ultra vacuum condition in the inner circumferential face 10A2 of the vacuum use cylindrical shaft 10 shuts off the outside temperature efficiently to the first pipe 20E and the second pipe 20B. Then, the supplying refrigerant "Q1" supplied from the refrigerant supplying apparatus such as cryogenic liquid helium, nitrogen, neon and the like is maintained in the cryogenic condition in the inside of the circumferential face 10A2 of the vacuum use cylindrical shaft 10, and supplied to a cooling portion 105 of the superconducting motor 100 through the first pipe 20E and the second pipe 20E to cool the cooling portion 105.

Also, it is possible to cover (coating) the outer circumferential faces of the first and the second pipe 20E, 20E, 20E by thermal insulation material such as PTFE, silica and the like, since the first and the second pings 20E, 20E, 20E are arranged in the inner circumferential face of the vacuum use cylindrical shaft 10. Therefore, it is possible to exert the thermal insulation effect of the first pie 20E, 20E and the second pipe 20E to maintain a sealing capability of the second mechanical seal device 1.

Also, with respect to the inside of the first and second spaced fluid passage 20B, 20B arranged in parallel at the second mechanical seal device 1, both sides in a radial direction of a seal face 1A1 and a counter seal face 2A1 which are closely contact with each other are almost identical pressure, because same pressure refrigerant flows in the respective spaced fluid passage 20B, 20B. Therefore, even if the discharging refrigerant "Q2" is evaporated, it is possible to flow back the evaporated discharging refrigerant "Q2" to the refrigerant supplying apparatus linearly through the first fluid passage 20A by the action of centrifugal force of the rotating vacuum use cylindrical shaft 10. Thus, even if the discharging refrigerant "Q2" evaporates, it is available to prevent the evaporated discharging refrigerant "Q2" from being mixed with the supplying refrigerant "Q1" through a sliding face of the seal face 1A1 and the counter seal face 2A1. Accordingly, it is possible to prevent the temperature of the supplying refrigerant "Q1" from rising by mixing the evaporated discharging refrigerant "Q2" on the way to the refrigerant supplying apparatus with the supplying refrigerant "Q1". Then, the sealing capability of the second mechanical seal device 1 can be exerted more efficiently. Also, in the cooling portion (superconducting magnetic field coil) 105 of the superconducting motor 100, a liquid pool portion of the cooling portion 105 is cooled by the supplied cryogenic supplying refrigerant "Q1", to make the electric resistance thereof at zero (0). As a result, when the superconducting magnetic field coil is magnetized, a strong magnetic field without magnetization loss is generated by the superconducting magnetic field coil whose electric resistance is made at zero (0).

Figure 7:
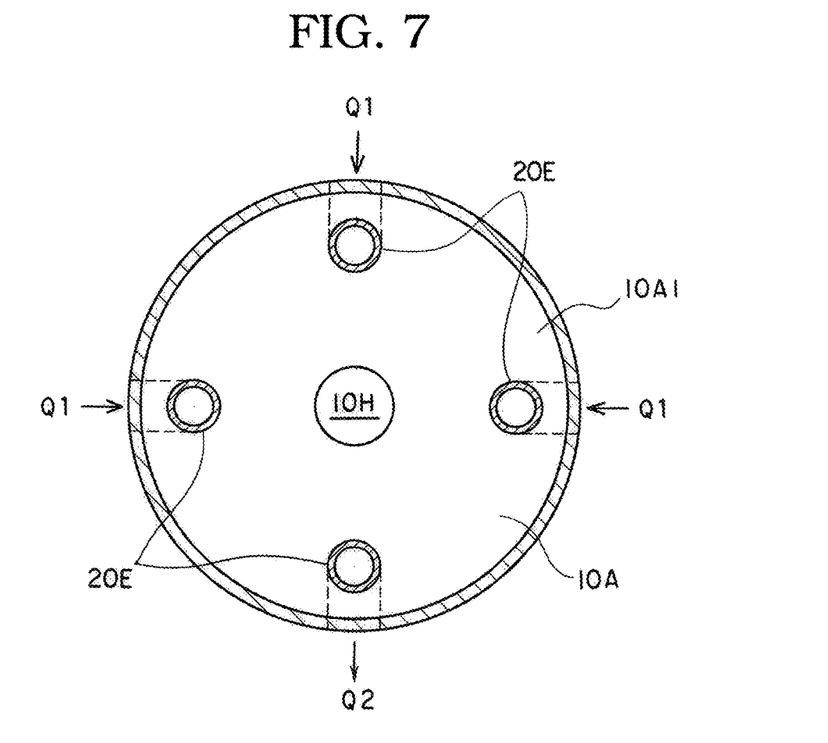
FIG. 7 is a front view of a connecting portion of an embodiment 2 in the axial direction according to the present invention.

FIG. 7 shows a second embodiment and is a front view of the connecting portion 10A1 corresponding to a view in the X-X arrows direction in FIG. 1. This connecting portion 10A1 is formed in a cylindrical shape shorter than the connecting portion 10A1 shown in FIG. 2, and a vacuum passage 10H in a circular shape is formed in an inner circumferential face thereof. Then, in FIG. 7, as similar with the connecting fluid passage 20D shown in the connecting portion 10A1 of FIG. 2, it is formed at 4 or more positions in a radial direction of the connecting portion 10A1 (4 positions in FIG. 4). Respective first pipes 20E is hermetically fitted to connecting bores 20D1 of three of these connecting fluid passages 20D, 20D, 20D. Then, the supplying refrigerant "Q1" is flowed in the first pipes 20E. Further, a second pipe 20E for the discharging refrigerant "Q2" is hermetically fitted to the left 1 position or 2 positions connecting bore 20D1 (for numeral reference, refer to FIG. 2). These connecting fluid passages 20D, 20D, 20D of three positions for the supplying refrigerant "Q1" are formed at almost same position in the axial direction, but formed at different positions along the circumferential direction in the connecting portion (refer to a constitution of arrangement of the second fluid passage 20C of FIG. 8). Also, a connecting fluid passage 20D for the discharging refrigerant "Q2" is formed at different position from the three of the connecting fluid passages 20D, 20D, 20D for the supplying refrigerant "Q1" in the axial direction in the connecting portion 10A1, so as to communicate with the second spaced fluid passage 20B. Thus, since the connecting portion 10A1 can be formed in a cylindrical shape which is short in the axial direction, a length in an axial direction of the vacuum passage 10H can be shortened, too.

Also, the effect of vacuum thermal insulation can be improved by forming the inside in a radial direction of the inside of the connecting portion 10A1 in various shapes. For example, the front shape of the vacuum passage 10H in the connecting portion 10A1 is not limited to a circular shape, but also it can be formed in a square shape, a shape with concave and convex faces such as a star shape or a geared shape, an oval shape and the like, to couple large number of the first pipe 20E and the second pipe to the side faces thereof. Note that, only one of the second mechanical seal is enough for the three connecting fluid passages 20D, 20D, 20D for the supplying refrigerant. Then, the supplying refrigerant "Q1" is supplied to the superconducting magnetic field coil of the superconducting motor 100 by multiple first pipe 20E to cool the superconducting magnetic field coil at cryogenic temperature, so that the electric resistance can be zero (0). Also, the discharging refrigerant "Q2" can be flowed back efficiently to the refrigerant supplying apparatus by constituting a plurality of the second pipe for the discharging refrigerant "Q2" as similar with above mentioned connecting fluid passages 20D, 20D, 20D.

Figure 8:
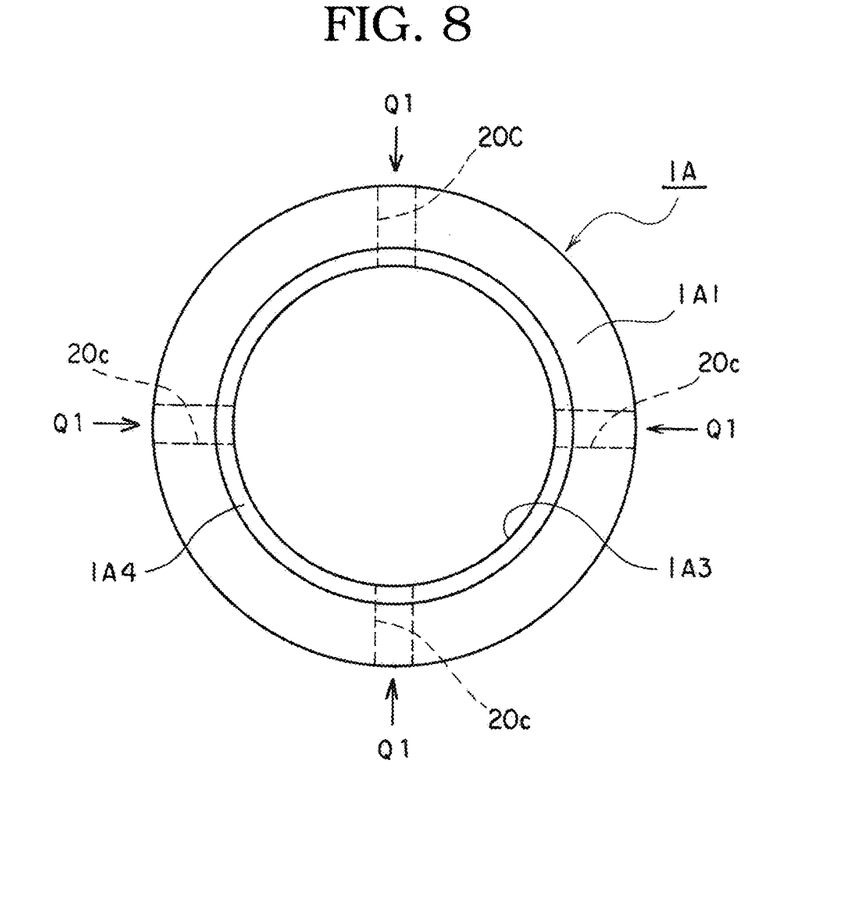
FIG. 8 is a front view of a rotary seal ring of an embodiment in the axial direction according to the present invention.

FIG. 8 is a front view of the rotary seal ring 1A in the axial direction, which is fitted to the vacuum use cylindrical shaft 10. This rotary seal ring 1A is an embodiment 3. The rotary seal ring 1A shown in FIG. 8 is an example wherein the second fluid passages 20C penetrating to the inside thereof are provided at four positions along a circumferential face threreof. An inner circumferential face 1A3 of the rotary seal ring 1A is fitted to the outer circumferential face of the connecting portion 10A1 to communicate the four positions of the second fluid passages 20C with the four positions of connecting fluid passages 20D respectively. Then, the supplying refrigerant "Q1" supplied from the one position of first fluid passage 20A is flowed into the four positions of second fluid passages 20C. Also, respective seal faces 1A1, 1A1 are formed on both end faces of the rotary seal ring 1A. Further, seal mounting grooves 1A4, to which a seal ring 83B shown in FIG. 3 can be mounted, are formed on the inner circumference side of the both seal faces 1A1 of the rotary seal ring 1A.

In FIG. 8, with respect to the second fluid passages 20C of the rotary seal ring 1A and the connecting fluid passages 20D of the connecting component 10A1, although it is specified as 4 numbers example, the second fluid passages 20C, the connecting fluid passages 20D and the second pipes 20E may be provided multiple such as 5 or 6 corresponding to e to the number of the cooling portion 105. In this manner, it becomes possible to supply the supplying refrigerant "Q1" to the multiple numbers of cooling portions 105 without increasing of number of the second mechanical seal device. This constitution that the supplying refrigerant "Q1" can be supplied to the multiple numbers of the cooling portions 105 by the one second mechanical seal device 1, can be realized by a combination of the constitution of the second mechanical seal device and the connecting component 10A1 of the present invention. Note that, as another example, there is a case that the second mechanical seal device 1 is consist of one second mechanical seal device. In this case, although it is not shown in drawings, the discharging refrigerant is flowed back to the refrigerant supplying apparatus through the second pipe provided in other fluid passage.

As a comparing example of the present invention, in FIG. 1, in case that the magnetic fluid seal device 40 is replaced to a conventional magnetic fluid seal device, there will be no magnetic fluid, because the magnetic fluid of the magnetic fluid seal device is sucked to a vacuum side in response to high vacuum condition. Thus, it becomes difficult to maintain the vacuum condition in the vacuum passage. Accordingly, the vacuum thermal insulation effect is decreased, too. As a result, it will be difficult to cool the cooling portion unless large amount of the supplying refrigerant is flowed by making diameters of the respective fluid passages and the first pipe larger. Further, a running cost of the costly supplying refrigerant used for the superconductive motor increases. Also, in a constitution wherein the large amount of the refrigerant is supplied, a manufacturing cost increases, because the rotary joint becomes larger. Also, there is a case that it becomes difficult to mount the rotary joint due to the mounting position, because a mounting location of the rotary joint becomes larger. Note that, the main body means fixed components such as the first main body 60, the second main body 65, the first outer cylinder 60A, the second outer cylinder 65A and the like against rotating vacuum use cylindrical shaft 10.

INDUSTRIAL APPLICABILITY

The present invention relates to a rotary joint which is useful for supplying a supplying refrigerant such as liquid nitrogen, liquid helium and the like from a refrigerant supplying apparatus on the stationary side to a cooling portion of a superconducting apparatus which is rotating in the condition that the cryogenic temperature of the refrigerant is maintained.

The invention claimed is:

1. A rotary joint for a refrigerant configured to connect fluid passages between a refrigerant supplying apparatus on a stationary side and a cooling portion on a rotary side, comprising:
a vacuum use cylindrical shaft supported by a main body in rotatable condition, and having a vacuum passage penetrating into the vacuum use cylindrical shaft in an axial direction, a coupling portion at one end of said vacuum passage for communicating said vacuum passage with said cooling portion, an opening at another end of said vacuum passage for vacuum suction, and a connecting portion at a middle of said coupling portion and said opening;

a first set of seal rings and resilient bellows including a rotary seal ring rotating with said vacuum use cylindrical shaft, a pair of stationary seal rings and a pair of resilient bellows;

said rotary seal ring hermetically fitted to said connecting portion of said vacuum use cylindrical shaft, and having seal faces which are circumferential surfaces provided at both end portions of said rotary seal ring in the axial direction;

said pair of stationary seal rings provided on both sides in an axial direction of said rotary seal ring, and having counter seal faces respectively contacting hermetically with said seal faces facing thereto; and said pair of resilient bellows for pressing said stationary seal rings resiliently to said seal faces, and respectively having a joint portion and a fixed portion, said joint portion being provided at one end of said resilient bellows and being connected hermetically with an opposite face from said counter seal face of said stationary ring, said fixed portion being provided at another end of said resilient bellows, enclosing said vacuum use cylindrical shaft, and being fixed to said main body;

a first spaced fluid passage formed between said pair of resilient bellows and on an outer side of said rotary seal ring and said pair of stationary seal rings and communicated with a first fluid passage to introduce a supplying refrigerant;

a second fluid passage penetrating through said rotary seal ring in a radial direction and communicated with said first spaced fluid passage;

a connecting fluid passage provided in said connecting portion, communicated with said second fluid passage at one end of said connecting fluid passage, and having a connecting bore at another end of said connecting fluid passage;

a first pipe arranged in said vacuum passage of said vacuum use cylindrical shaft, and having a fluid passage connected with said connecting bore at one end of said fluid passage to be communicated with said connecting fluid passage and communicated with said cooling portion at another end of said fluid passage;

a coupling cover having a suction bore for exerting vacuum suction on an inside of said vacuum passage through said opening of said vacuum use cylindrical shaft, and a magnetic fluid seal device
having a magnetic fluid seal cover, pole blocks, magnets, a shaft cover, and magnetic fluid, in which,
said magnetic fluid seal cover is hermetically coupled with said coupling cover to enclose said vacuum use cylindrical shaft,
said pole blocks are for magnets, are arranged in parallel, and are hermetically fitted on one circumferential face of an inner circumferential face of said magnetic fluid seal cover or an outer circumferential face of said vacuum use cylindrical shaft,
said magnets are arranged in spaces between said pole blocks arranged in parallel,
said shaft cover has a projection group in which a plurality of projections are arranged in a manner that said respective projections are close to and facing circumferential faces of said respective pole blocks and are fitted on another circumferential face of an inner circumferential face of said magnetic fluid seal cover or an outer circumferential face of said vacuum use cylindrical shaft,
said magnetic fluid existing between said projections and said pole blocks, and wherein a magnetic force generated by said magnets, pole blocks, and projections is exerted on said magnetic fluid, and said magnetic fluid exists between said projections and said pole blocks to close a space between said projections and said pole blocks to maintain a vacuum condition of a suction space.

2. The rotary joint as set forth in claim 1, further comprising a second set of seal rings and resilient bellows including a second rotary seal ring, a second pair of stationary seal rings and a second pair of resilient bellows so that the rotary joint includes two sets of seal rings and resilient bellows as a whole, wherein said two sets of said rotary seal rings and said stationary rings of both sides of said rotary seal ring are arranged in the axial direction, a second spaced fluid passage is provided between adjacent stationary seal rings of one set and the other set of said two sets, said second spaced fluid passage communicates with a second pipe arranged in said vacuum passage of said vacuum use cylindrical shaft, so that a discharging refrigerant after cooling said cooling portion is returned back through said second pipe and said second spaced fluid passage.

3. The rotary joint as set forth in claim 1, wherein an inner circumferential portion of said connecting portion is formed as a circular face, an oval face, a convex-concave face or a toothed gear shape face along the circumferential direction.

4. The rotary joint as set forth in claim 1, wherein said rotary seal ring comprises a plurality of said second fluid passages arranged along the circumferential direction, said connecting portion comprises said connecting fluid passages along the circumferential direction which communicate with said respective second fluid passages, and said fluid passages of respective said first pipes communicate with said connecting fluid passages respectively corresponding to said first pipe.

5. The rotary joint as set forth in claim 1, wherein the counter seal face slidably engages the seal face.

6. The rotary joint as set forth in claim 1, wherein said pair of resilient bellows elastically presses said stationary seal rings to said seal faces.

* * * * *